(12) United States Patent
Kim

(10) Patent No.: US 9,242,541 B2
(45) Date of Patent: Jan. 26, 2016

(54) INTEGRATED TYPE ENGINE MOUNT FOR VEHICLE

(71) Applicants: Hyundai Motor Company, Seoul (KR); Kia Motors Corporation, Seoul (KR)

(72) Inventor: Hyo Seok Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 19 days.

(21) Appl. No.: 14/106,199

(22) Filed: Dec. 13, 2013

(65) Prior Publication Data

US 2015/0041620 A1 Feb. 12, 2015

(30) Foreign Application Priority Data

Aug. 6, 2013 (KR) .......................... 10-2013-0092904

(51) Int. Cl.
*F16M 1/00* (2006.01)
*B60K 5/12* (2006.01)
*F16F 15/08* (2006.01)

(52) U.S. Cl.
CPC ............... *B60K 5/1208* (2013.01); *F16F 15/08* (2013.01)

(58) Field of Classification Search
CPC ......... F16M 5/00; F16F 15/08; B60K 5/1208; B60K 5/1216

USPC ......... 248/634, 637, 673, 638, 646, 676, 658, 248/671

See application file for complete search history.

(56) References Cited

U.S. PATENT DOCUMENTS

| | | | |
|---|---|---|---|
| 2004/0195033 A1* | 10/2004 | Kim | 180/291 |
| 2005/0218570 A1* | 10/2005 | Ueki | 267/140.11 |
| 2005/0218734 A1* | 10/2005 | Tahara et al. | 310/90 |
| 2005/0258581 A1* | 11/2005 | Tanaka | 267/140.11 |
| 2012/0084965 A1* | 4/2012 | Kim et al. | 29/525.11 |
| 2013/0001843 A1* | 1/2013 | Kanaya | 267/140.14 |
| 2013/0292888 A1* | 11/2013 | Hwang et al. | 267/140.13 |

FOREIGN PATENT DOCUMENTS

| | | |
|---|---|---|
| JP | 08-326830 A | 12/1996 |
| JP | 2008-223850 A | 9/2008 |
| JP | 2012-207703 A | 10/2012 |
| KR | 1020120136747 A | 12/2012 |

* cited by examiner

*Primary Examiner* — Mark Wendell
(74) *Attorney, Agent, or Firm* — Morgan, Lewis & Bockius LLP

(57) ABSTRACT

An integrated engine mount for a vehicle may include a housing bracket and a base bracket vertically coupled, a car body bracket to be connected with a car body, and an insulator and a case bracket fitted inside the housing bracket and the base bracket. An edge of an upper end of the case bracket may be bent to form a folded portion and the folded portion is covered with a rubber member.

5 Claims, 5 Drawing Sheets

INTEGRATED TYPE ENGINE MOUNT FOR VEHICLE

CROSS-REFERENCE TO RELATED APPLICATION

The present application claims priority of Korean Patent Application Number 10-2013-0092904 filed Aug. 6, 2013, the entire contents of which application are incorporated herein for all purposes by this reference.

BACKGROUND OF INVENTION

1. Field of Invention

The present disclosure relates to an engine mount for a vehicle using the liquid in an insulator as a working fluid. More particularly, it relates to an integrated type engine mount for a vehicle which is formed by welding a base bracket, an upper housing, and a car body bracket as one unit, and then forcibly fitting an insulator and a case bracket.

2. Description of Related Art

In general, the engine of a vehicle cannot avoid vibrating for the structural reason and also vibrates responding to the roughness of a road during operation. The vibration is generated by a combination of various factors. Since the engine installed being connected to a transmission and an air-conditioning system the vibration of an engine influences the entire body of the vehicle.

Accordingly, an engine is supported by an engine mount in order to reduce its vibration and the engine mount is generally of a lever type using the elastic force of the material itself and a fluid filled type reducing vibration, using an elastic effect of a built-in fluid. One of the engine mounts currently used is a fluid-filled type mount having two fluid-filled liquid chambers formed inside an insulator made of synthetic resin, and a nozzle plate disposed between the liquid chambers for flow of the fluid, thereby reducing both high- and low-frequency vibrations.

Various types of fluid filled type engine mounts have been disclosed in Korean Patent Application Publication No. 10-2011-0042413, Korean Patent Application Publication No. 10-2011-0057850, and Korean Patent Application Publication No. 10-2011-0106077. For example, "Integrated type engine mount" has been disclosed in Korean Patent Application Publication No. 10-2011-0106077 and the integrated type engine mount, as shown in FIGS. 1 and 2, has a structure in which a car body bracket 110 connected with a base bracket 100 and a car body and a case bracket 140 integrally welded with a housing bracket 120 and cured with an insulator 130 are forcibly fitted. The reference numeral 150 represents a diaphragm, 160 a nozzle plate, and 170a and 170 indicate liquid chambers, respectively.

The integrated type engine mount, however, has the following various problems. First, the insulator and the case bracket are forcibly fitted, with the base bracket and the housing bracket welded and electro-deposition coating finished, in which the end of the case bracket scratches the inner side of the base bracket in fitting and the paint on the inner side of the base bracket is peeled off, such that a problem occurs in rust preventing and the commercial value is deteriorated. Second, in expansion due to movement of the insulator, the insulator may be damaged by interference with the edge of the housing bracket. Third, there is an issue of durability of the insulator such as separation of the bonded edges of the insulator and the case bracket and cracks, in stress concentration due to bad coating and reduction of bonding force.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide an integrated engine mount for a vehicle which can keep stable bonding force by securing a sufficient contact surface, improve durability with improvement of stress concentration at edges, prevent paint from being peeled off in forcibly fitting an insulator, and remove a problem in rust preventing, by implementing a new type mount structure with a smooth rounded edge, instead of an incomplete edge, at the bonding portion of the insulator, by hemming the edge of the upper end of a case bracket cured with the insulator.

An integrated engine mount for a vehicle of the present invention may include a housing bracket and a base bracket vertically coupled, a car body bracket to be connected with a car body, and an insulator and a case bracket fitted inside the housing bracket and the base bracket, wherein an edge of an upper end of the case bracket is bent to form a folded portion and the folded portion is covered with a rubber member. Therefore, since the integrated engine mount includes the case bracket having the folded portion covered with the rubber member, it has a structural feature that the durability can be improved by securing a sufficient bonding surface and preventing stress concentration at the edge.

The outer diameter of the folded portion may be smaller than the inner diameter of the base bracket and the outer diameter of the rubber member covering the folded portion may be larger than the inner diameter of the base bracket, such that the rubber member can be brought in close contact with the inner side of the base bracket under pressure when the insulator and the case bracket are fitted or forcibly fitted.

The folded portion of the case bracket may be formed by bending the upper end of the bracket outward or inward and then bending it again in two or more folds. The housing bracket and the base bracket may be coupled by welding the bending portion at the upper end of the base bracket inside the lower end of the housing bracket.

The integrated engine mount for a vehicle of the present invention has the following advantages. First, since the edge of the upper end of the case bracket is bent and cured with rubber, it is possible to prevent stress concentration and maintain bonding force at the edge by securing a sufficient bonding surface, such that it is possible to improve the durability of the entire engine mount, including the insulator. Second, it is possible to remove a problem in rust preventing and secure quality of the produce while preventing the paint on the inner side of the base bracket from being peeled off when forcibly fitting the insulator and the case bracket. Third, sealing is achieved by pressing the rubber cured on the edge of the upper end of the case bracket, such that it is possible to foreign substances from flowing into the lower space and achieve sealing for the portion with poor coating.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
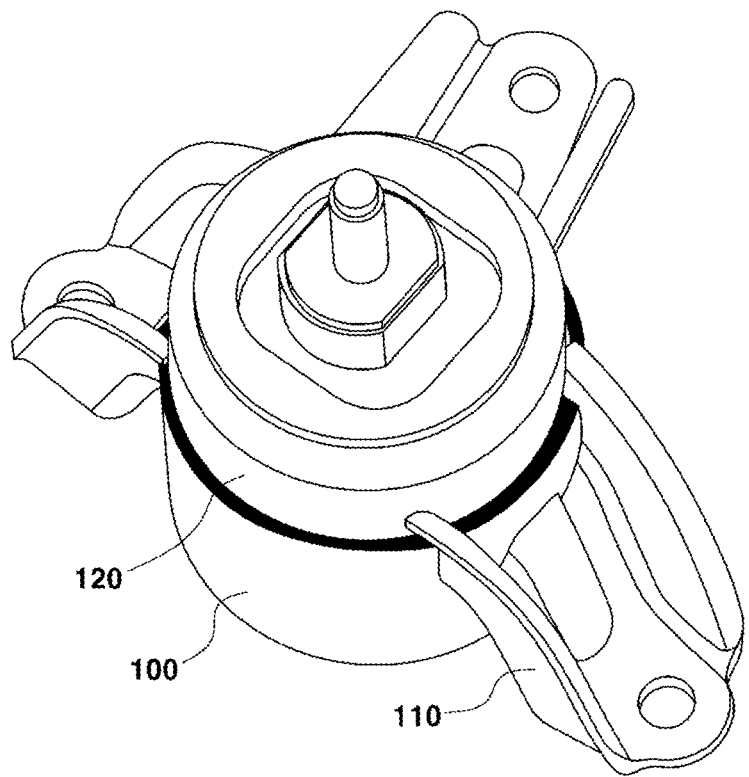
FIG. 1 is a perspective view showing an integrated type engine mount for a vehicle in the related art.
Figure 2:
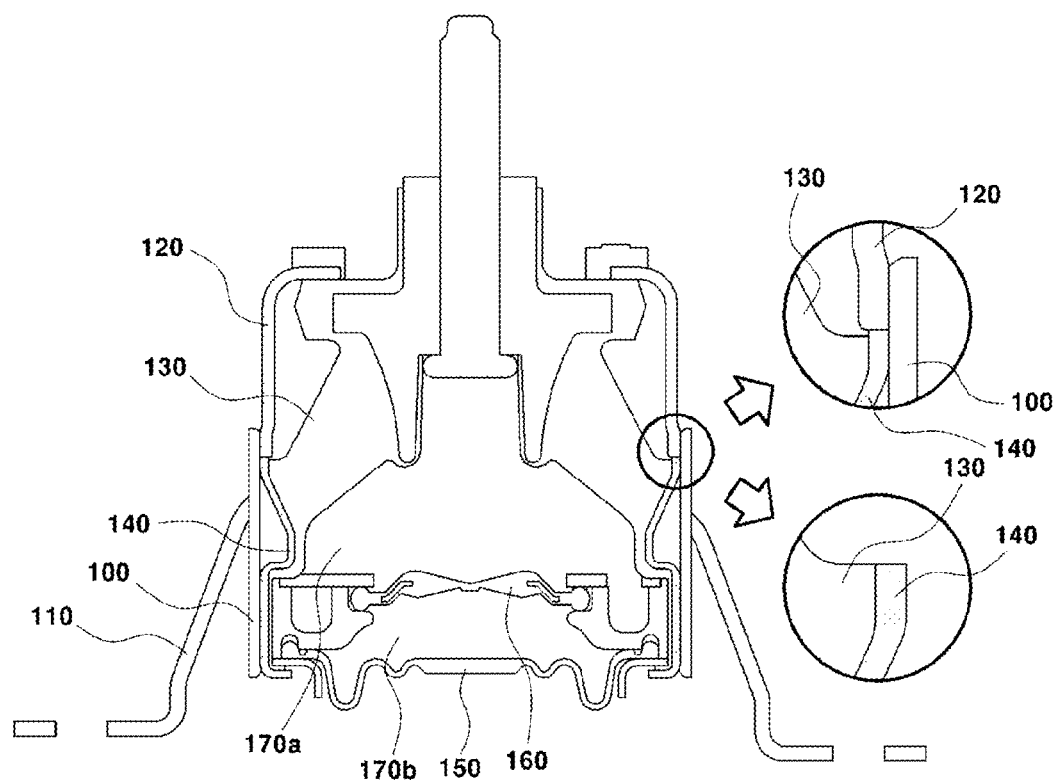
FIG. 2 is a cross-sectional view showing the integrated type engine mount for a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
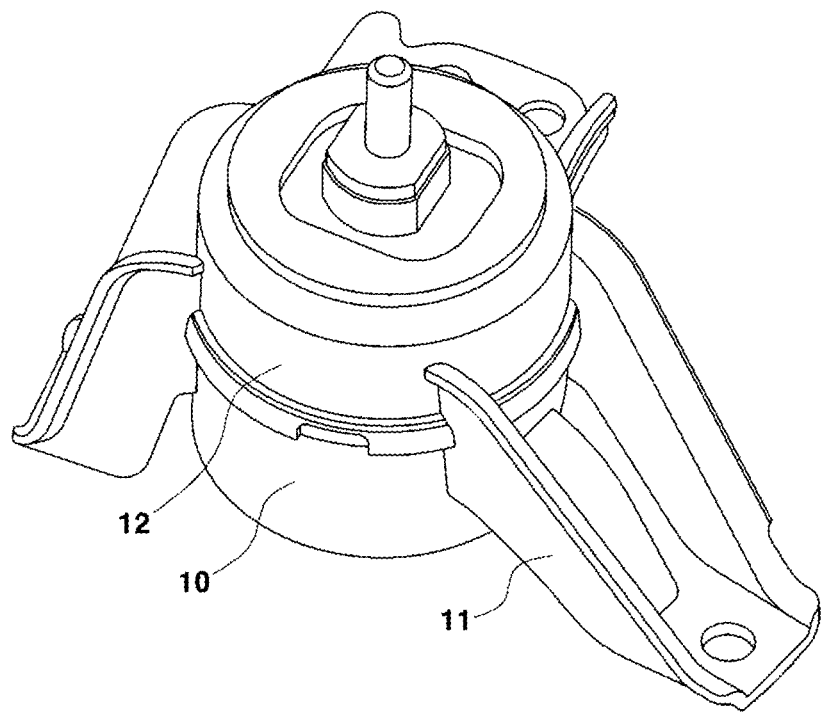
FIG. 3 is a perspective view showing an exemplary integrated type engine mount for a vehicle according to the present invention.
Figure 4:
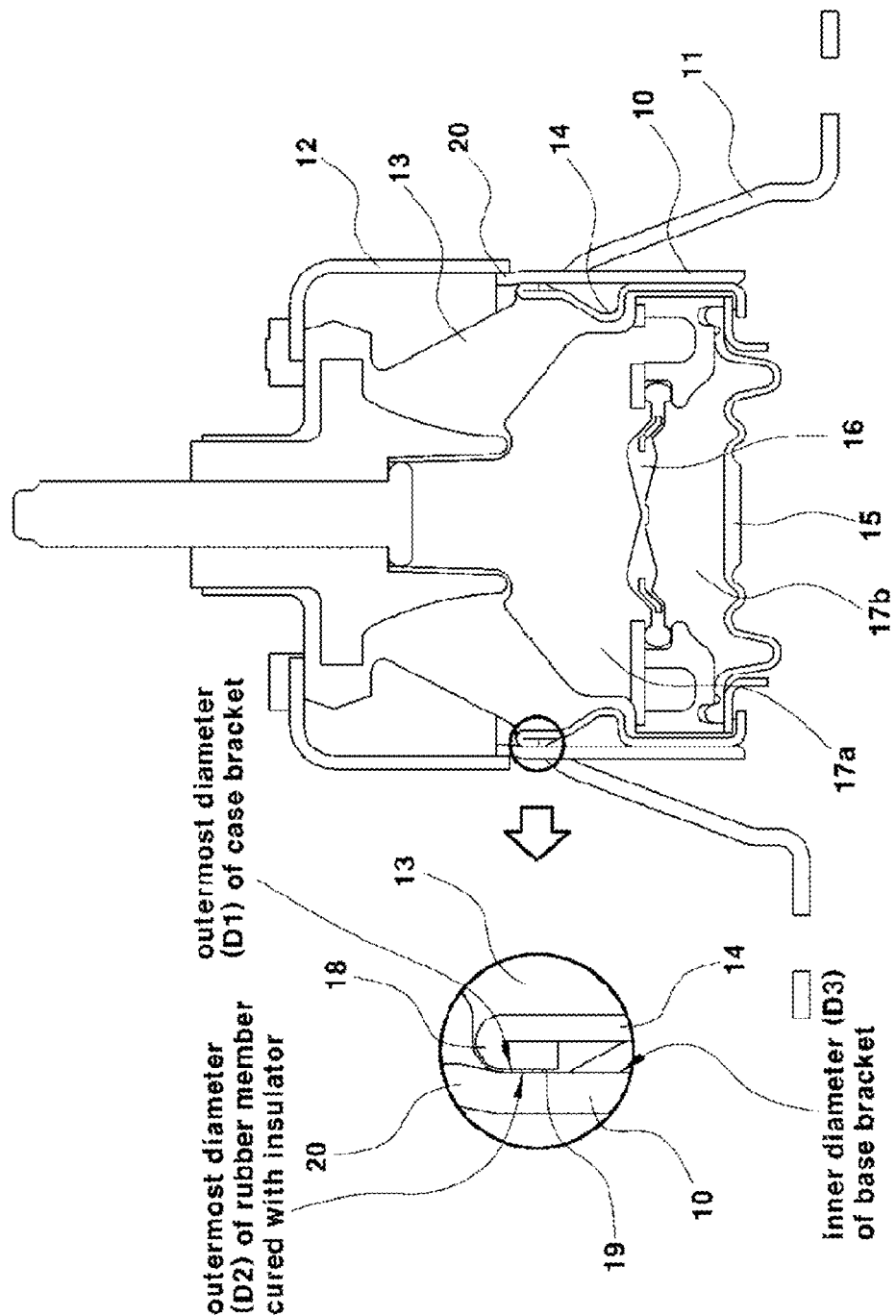
FIG. 4 is a cross-sectional view showing an exemplary integrated type engine mount for a vehicle according to the present invention.

FIG. 3 is a perspective view showing an integrated type engine mount for a vehicle and FIG. 4 is a cross-sectional view showing the integrated type engine mount for a vehicle according to various embodiments of the present invention. As shown in FIGS. 3 and 4, the integrated engine mount has a structure of a fluid filled type integrated engine mount, in which a housing bracket 12 and a base bracket 10 are vertically combined, a car body bracket 11 to be connected with a car body is coupled to the outer side of the base bracket 10, and a case bracket 14 cured with an insulator 13 is forcibly fitted in the housing bracket 12 and the base bracket 10.

A nozzle plate 16 is disposed inside the case bracket 14 with the bottom formed of or comprised of a diaphragm 15, liquid chambers 17a and 17b are defined over and under the nozzle plate 16, and fluid in the liquid chambers 17a and 17b flow between the liquid chambers 17a and 17b through the nozzle plate 16.

The housing bracket 12, the base bracket 10, and the car body bracket 11 can be integrally combined or coupled by spot welding or arc welding at the contact portions, or monolithically formed or the like. Electro-deposition coating is performed on all of the integrally combined housing bracket 12, base bracket 10, and the car body bracket 11, and the insulator 12 and the case bracket 14 are forcibly fitted inside the housing bracket 12 and the base bracket 10 after the electro-deposition coating, thereby achieving one integrated engine mount.

In particular, the present invention provides an integrated engine mount that can have excellent durability by improving the shape and structure of the case bracket 14. To this end, the upper edge of the case bracket 14 is folded to form a folded portion 18, and the folded portion 18 is formed by bending outward the upper end of the case bracket and then bending it inward again into two folds, or in some cases more than two folds. That is, the folded portion 18 is overlapped in two or more folds by hemming that bending and pressing the upper edge of the case bracket 14.

The folded portion 18 is continuously formed along the circumference at the upper end of the case bracket 14. Further, the folded portion 18 is covered with a rubber member 19, which surround the entire or substantially the entire folded portion, including the outer side of the folded portion 18, and can be cured around the folded portion 18 in curing of the insulator. As hemming is performed on the upper end of the case bracket 14, a smooth rounded end can be achieved, such that it is possible to secure a sufficient bonding area in addition to preventing stress concentration.

The outer diameter of the folded portion 18 is smaller than the inner diameter of the base bracket 10. That is, the relationship, the outer diameter D1 of the case bracket with the folded portion<the inner diameter D3 of the base bracket, is satisfied.

Further, the outer diameter of the rubber member 19 covering the folded portion 18 is larger than the inner diameter of the base bracket 10. That is, the relationship, the outer diameter D2 of the rubber member>the inner diameter D3 of the base bracket, is satisfied (FIG. 4 shows the rubber member pressed after fitting in the enlarged view).

Accordingly, the rubber 19 can be brought in close contact with the inner side of the base bracket 10 under pressure, when the insulator 13 and the case bracket 14 are forcibly fitted, such that it is possible to prevent the paint on the inner side of the base bracket from being peeled off due to contact between the brackets in fitting, unlike the related art.

Further, as the rubber member 19 covering the folded portion 18 of the case bracket 14 is in close contact with the inner side of base bracket 10, a hermetic structure is achieved. Accordingly, it is possible to prevent foreign substances such as water, moisture, and dust, which flow into the upper space between the outer side of the insulator 13 and the inner side of the housing bracket 12, that is, the insulator flow space, from flowing into the lower space between the outer side of the case bracket 14 and the inner side of the base bracket 10 (where the uncoated portion of the case bracket and the peeled-off portion of the base bracket).

Further, the housing bracket 12 and the base bracket 10 can be closely combined by the coupling using the bending portion and the welded structure. That is, a bending portion 20 slightly bending inward at the upper end of the base bracket 10 is formed and the lower end of the housing bracket 12 is welded with the bending portion 20 while receiving it, such that the housing bracket 12 and the base bracket 10 can be closely combined.

Figure 5:
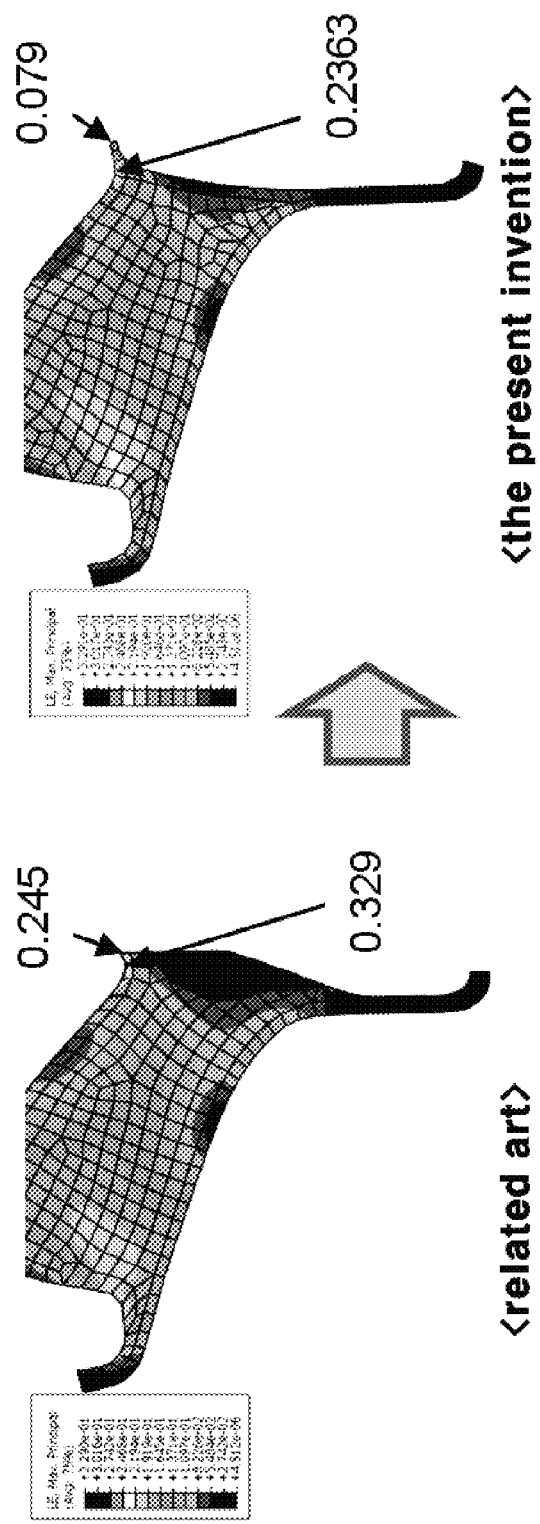
FIG. 5 is a schematic view showing the degree of improvement in durability according to improvement of stress concentration and bonding force at the edge of the integrated engine mount for a vehicle according to the present invention.

FIG. 5 is a schematic view showing the degree of improvement in durability according to improvement of stress concentration and bonding force at the edge of the integrated engine mount for a vehicle according to various embodiments of the present invention. FIG. 5 compares the maximum stress and the stress at the bonding end (the bonding portion between the insulator rubber and the upper end of the case bracket) of an integrated engine mount with a hemming structure of the present invention with those of the related art.

According to the integrated engine mount of the present invention, the maximum stress was improved about 39% from 0.329 of related art to 0.2363 of an exemplary embodiment of the present invention and the stress at the bonding end was improved about 310% from 0.245 of related art to 0.079 of an exemplary embodiment of the present invention. Therefore, it is possible to improve durability with improvement of stress concentration and bonding force at the edge.

According to the present invention, as described above, since a sufficient bonding surface is secured by making a smooth rounded portion at the rubber-bonded portion instead of an incomplete edge through hemming on the upper end of the case bracket cured with rubber, and durability is improved with bonding force maintained by preventing stress concentration at the edge, it is possible to improve durability with improvement of stress concentration and improve rust preventing performance by preventing inflow of water.

For convenience in explanation and accurate definition in the appended claims, the terms "upper" or "lower", "front" or "rear", "inner" or "outer", etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated engine mount for a vehicle, comprising:
   a housing bracket and a base bracket vertically coupled each other;
   a car body bracket mounted on the housing bracket or the base bracket and connected with a car body; and
   an insulator and a case bracket fitted inside the housing bracket and the base bracket,
   wherein an upper end of the case bracket is in a shape bent downwards in a radial direction of the case bracket and facing a body of the case bracket at an acute angle with the body of the case bracket to form a folded portion and the folded portion is covered with a rubber member connected to the insulator,
   wherein an upper side of the case bracket contacts an outer circumference surface of the folded portion covered with the rubber member connected to the insulator.

2. The integrated engine mount of claim 1, wherein:
   an outer diameter of the folded portion is smaller than an inner diameter of the base bracket,
   an outer diameter of the rubber member covering the folded portion is larger than the inner diameter of the base bracket, and
   the insulator and the case bracket are connected to each other and the rubber member is in close contact with an inner side of the base bracket under pressure.

3. The integrated engine mount of claim 2, wherein the folded portion of the case bracket is formed by bending the upper end of the case bracket outward or inward and then bending the upper end again in two or more folds.

4. The integrated engine mount of claim 1, wherein the folded portion of the case bracket is formed by bending the upper end of the case bracket outward or inward and then bending the upper end again in two or more folds.

5. The integrated engine mount of claim 1, wherein the housing bracket and the base bracket are coupled by welding a bending portion at the upper end of the base bracket inside an lower end of the housing bracket.

\* \* \* \* \*